US012669483B2

(12) United States Patent
King et al.

(10) Patent No.: US 12,669,483 B2
(45) Date of Patent: Jun. 30, 2026

(54) SYSTEM FOR AUTOMATIC NON-DESTRUCTIVE TESTING OF ROTATING COMPONENTS

(71) Applicant: Verifi Technologies, LLC, Waco, TX (US)

(72) Inventors: Zach King, New Richmond, WI (US); Paul Hill, New Richmond, WI (US); Luke Bach, New Richmond, WI (US); Greg Power, New Richmond, WI (US); Jesse Georgius, New Richmond, WI (US); Calvin Bunge, New Richmond, WI (US); Preston Germain, New Richmond, WI (US); Kyle Stork, New Richmond, WI (US); Larry Culbertson, New Richmond, WI (US); Benjamin M. Blandford, Waco, TX (US); Nathaniel J. Blackman, Hewitt, TX (US); Gary Georgeson, Tacoma, WA (US)

(73) Assignee: Verifi Technologies, LLC, Waco, TX (US)

( * ) Notice: Subject to any disclaimer, the term of this patent is extended or adjusted under 35 U.S.C. 154(b) by 314 days.

(21) Appl. No.: 18/591,915

(22) Filed: Feb. 29, 2024

(65) Prior Publication Data

US 2024/0302328 A1 Sep. 12, 2024

Related U.S. Application Data

(60) Provisional application No. 63/450,811, filed on Mar. 8, 2023.

(51) Int. Cl.
*G01N 29/275* (2006.01)
*G01N 29/24* (2006.01)

(52) U.S. Cl.
CPC ....... *G01N 29/275* (2013.01); *G01N 29/2487* (2013.01); *G01N 2291/106* (2013.01)

(58) Field of Classification Search
CPC ............ G01N 29/275; G01N 29/2487; G01N 29/043; G01N 29/225; G01N 29/265; G01N 29/28; G01N 2291/106
See application file for complete search history.

(56) References Cited

U.S. PATENT DOCUMENTS

| | | | |
|---|---|---|---|
| 5,007,291 A | 4/1991 | Walters et al. | |
| 6,070,466 A | 6/2000 | Taran et al. | |
| 6,748,808 B2 | 6/2004 | Lam et al. | |
| 6,769,957 B2 | 8/2004 | Buttram | |
| 6,941,231 B2 | 9/2005 | Zeroug et al. | |

(Continued)

FOREIGN PATENT DOCUMENTS

RU        2085935 C1    7/1997

*Primary Examiner* — Jonathan M Dunlap
(74) *Attorney, Agent, or Firm* — Neo IP

(57) ABSTRACT

The present invention is directed to nondestructive testing of objects, and more specifically to a system for nondestructive testing of an object using a robotic arm. The end effector of the robotic arm is equipped with an arrangement of paired, angled transducers and an orthogonal transducer configured to scan an object using multiple wavelengths of ultrasonic sound waves. Multiple scans of a test object are taken as the object is rotated and the scans are then wirelessly transmitted to a user device or a remote server.

20 Claims, 5 Drawing Sheets

(56)                     References Cited

U.S. PATENT DOCUMENTS

| | | | |
|---|---|---|---|
| 7,874,212 B2 | 1/2011 | Yamano | |
| 8,265,886 B2 | 9/2012 | Bisiaux et al. | |
| 8,365,603 B2 | 2/2013 | Lesage et al. | |
| 9,027,405 B2 | 5/2015 | Desai et al. | |
| 10,739,312 B2 | 8/2020 | Elmose et al. | |
| 11,408,861 B2 | 8/2022 | Heckel et al. | |
| 2023/0288373 A1* | 9/2023 | Gravagne | .......... G01N 27/9013 |

* cited by examiner

SYSTEM FOR AUTOMATIC NON-DESTRUCTIVE TESTING OF ROTATING COMPONENTS

CROSS-REFERENCE TO RELATED APPLICATIONS

This application is related to and claims priority from the following US patents and patent applications: this application claims priority from and the benefit of U.S. Provisional Patent Application No. 63/450,811, filed Mar. 8, 2023, which is incorporated herein by reference in its entirety.

BACKGROUND OF THE INVENTION

1. Field of the Invention

The present invention relates to nondestructive testing of objects, and more specifically to systems for rotating a test object and conducting multiple scans using a robotic arm end effector with an orthogonal transducer and paired, angled transducers.

2. Description of the Prior Art

It is generally known in the prior art to provide sensors capable of inspecting internal components of a test object for nondestructive testing of parts.

Prior art patent documents include the following:

U.S. Pat. No. 7,874,212 for Ultrasonic probe, ultrasonic flaw detection method, and ultrasonic flaw detection apparatus by inventor Yamano, filed Oct. 1, 2008 and issued Jan. 25, 2011, discloses an ultrasonic probe performs flaw detection of a high (t/D) metal pipe. The front end portion of a transducer has at least a portion with an asymmetrically curved shape having a radius of curvature which progressively increases from one end towards the other end of the front end portion. The probe is disposed with respect to the pipe with its end having the smaller radius of curvature positioned on the side away from the direction of propagation of refracted waves, the end having a larger radius of curvature thereof positioned on the side in the direction of propagation of refracted waves. Angle beam flaw detection is carried out such that incident waves are generated which generate refracted longitudinal waves which do not reach the inner surface of the metal pipe and refracted transverse waves which are focused on the inner surface of the pipe.

U.S. Pat. No. 9,027,405 for Ultrasonic inspection of an axle by inventors Desai et al., filed Nov. 20, 2012 and issued May 12, 2015, discloses a method and system for ultrasonic inspection of an axle. An ultrasonic probe and wedge are placed on the radial surface of an outboard journal of the axle and an ultrasonic scan is directed toward the inboard journal, wherein the devices mounted on the inboard journal remain mounted during the ultrasonic scan.

U.S. Pat. No. 6,769,957 for Creeping wave technique for mill roll inspection by inventors Buttram, filed Jun. 29, 2001 and issued Aug. 3, 2004, discloses a method and apparatus for simultaneously inspecting and grinding roll mills which utilizes a transducer assembly which produces a creeping wave propagation in conjunction with a couplant fluid provider and data acquisition circuit which allows the operator to see the crack and imperfections in on the surface of the mill rolls as they are rotated and to grind them off.

U.S. Pat. No. 10,739,312 for Ultrasonic inspection apparatus for a spherical body by inventors Elmose et al., filed Jun. 1, 2015 and issued Aug. 11, 2020, discloses a spherical body inspection apparatus including a support arrangement realized to support a spherical body during an inspection procedure; a probe arrangement comprising a plurality of ultrasonic testing probes arranged about the spherical body such that the ultrasonic testing probes target a common test point at the surface of the spherical body; and a displacer for effecting at least one relative rotational displacement between the spherical body and the probe arrangement. Also described is a method of inspecting a spherical body.

U.S. Pat. No. 6,748,808 for Flaw detection in tubular members by inventors Lam et al., filed Feb. 4, 2003 and issued Jun. 15, 2004, discloses a method, in at least certain aspects, for ultrasonically inspecting a tubular member, the tubular member having an inner surface, an outer surface, and two spaced-apart ends including a first end of the tubular member, the method including transmitting sonic beams to the tubular member with transducers such that sonic beams are reflected from the inner surface of the tubular member, the outer surface of the tubular member, and from the first end of the tubular member, sensing the first end of the tubular member, completing inspection of all or of substantially all of the outer surface of the tubular member for outer surface defects while continuing to inspect the inner surface of the tubular member for inner surface defects, continuing to inspect the inner surface of the tubular member for inner surface defects, the transducers continuing to transmit sonic beams for the inspection of the inner surface of the tubular member until the transducers are near the first end of the tubular member; and apparatus for such methods.

U.S. Pat. No. 11,408,861 for Transducer and transducer arrangement for ultrasonic probe systems, ultrasonic probe system and inspection method by inventors Heckel et al., filed Mar. 13, 2020 and issued Aug. 9, 2022, discloses a transducer made of at least three transducer elements which approximate a sector of an elementary wave with a virtual point source, and a transducer arrangement with three transducers made of at least three transducer elements, wherein the transducers, in the cross section, are disposed along the shorter base and the two non-parallel legs of a virtual trapezoid. Moreover, the invention relates to an ultrasonic probe system comprising the transducer arrangement according to the invention and an inspection method using a transducer made of at least three transducer elements, with the number of transducer elements experiencing a virtual increase.

U.S. Pat. No. 6,941,231 for Acoustic method for estimating mechanical properties of a material and apparatus therefor by inventors Zeroug et al., filed Dec. 11, 2001 and issued Sep. 6, 2005, discloses a method and apparatus for estimating the time varying mechanical properties of a cement including propagating acoustic waves through a cement sample, measuring signals corresponding to the acoustic waves after they propagate in the sample, comparing attributes from the measured signals with corresponding attributes provided by a model accounting for at least initially estimated acoustic properties of the cement, using the differences between the measured and calculated signals to update the initially estimated acoustic properties of the material in the calculating model, using the differences between the measured and calculated signals, updating the initial acoustic properties in the model, processing N iterations of the comparison and updating either until the differences between measured and calculated signals are within a given tolerance factor or when the number i reaches a prescribed maximum and calculating the time varying mechanical properties of the cement from the final iterated acoustic properties.

U.S. Pat. No. 8,265,886 for Non-destructive testing, in particular for pipes during manufacture or in the finished state by inventors Bisiaux et al., filed Jun. 25, 2007 and issued Sep. 11, 2012, discloses a non-destructive testing device for pipes. The device extracts information on defects from signals captured by ultrasound receivers following the selective excitation of ultrasound transmitters according to a selected time rule. The receivers form an arrangement with a selected geometry, coupled in an ultrasound fashion, with relative rotation/translation movement, with the pipe. The device includes a converter that selectively isolates a digital representation of echoes in designated time windows, as a function of the movement, and by extracting an image of defects, a filter which determines presumed defect zones and properties of these, a combiner to prepare working digital inputs from an extract of images of a defect zone, a neural circuit receiving the working inputs, a digital decision and alarm stage working on the basis of the output of the neural circuit, and a sorting and marking robot.

U.S. Pat. No. 6,070,466 for Device for ultrasonic inspection of a multi-layer metal workpiece by inventors Taran et al., filed May 12, 1998 and issued Jun. 6, 2000, discloses a device for the ultrasonic inspection of a multilayer metal workpiece consisting of at least one parent metal layer and a clad metal layer, and having an outer surface, at least one boundary surface, and an inner surface, the device comprising a housing accommodating at least three spaced-apart, ultrasonic transducing means capable of receiving electrical input signals, initiating transmission of ultrasonic waves to the workpiece, and receiving reflected ultrasonic waves to be transduced into electrical output signals, the transducing means being constituted by an acoustic prism having a first face for at least indirectly contacting a workpiece, a second face extending in a plane forming an angle $\alpha$ with the plane of the outer surface of the workpiece, and a piezocrystal attached to the second face, wherein the distance $L_2$ between the points where the acoustic axes of each of the second and the third spaced-apart transducing means of the three spaced-apart transducing means traverses the first face of its acoustic prism, is determined by the expression $L_2=K\cdot2$ h·tand, wherein K is a coefficient indicating the number of skips of the shear wave reflection from the inner surface of the workpiece, and h is the mean thickness of the clad metal layer.

U.S. Pat. No. 8,365,603 for Non-destructive testing, in particular for pipes during manufacture or in the finished state by inventors Lesage et al., filed Dec. 16, 2008 and issued Feb. 5, 2013, discloses a device forming an operating tool, for the non-destructive testing of iron and steel products, intended to extract information on possible imperfections in the product, from feedback signals that are captured by transmitting ultrasound sensors, receiving ultrasound sensors forming an arrangement with a selected geometry, assembled to couple in an ultrasound way with the product via the intermediary of a liquid medium, with relative rotation/translation movement between the pipe and the arrangement of transducers, said operating tool being characterized in that it comprises: a converter capable of selectively isolating a digital representation of possible echoes in designated time windows, as a function of the relative rotation/translation movement, said representation comprising the amplitude and time of flight of at least one echo, and of generating a parallelepipedic 3D graph, a transformer unit capable of generating a 3D image of possible imperfections in the pipe from the 3D graph and a database, a filter capable of determining, in the images, presumed imperfection zones (Zcur), and the properties of each presumed imperfection, and an output stage configured to generate a product conformity or non-conformity signal.

U.S. Pat. No. 5,007,291 for Ultrasonic inspection apparatus with centering means for tubular members by inventors Walters et al., filed Oct. 5, 1989 and issued Apr. 16, 1991, discloses a pipe inspection apparatus comprising transducers for transmitting pulsed beams of ultrasonic energy longitudinally, transversely and obliquely into the wall of the pipe for detection of flaws. The apparatus includes a motor driven chuck for rotating the transducers about the pipe P and motor driven roller for axial movement of the pipe whereby the transducers move in a helical scanning path. A control system maintains the axes of the pipe and circle array of transducers in coincidence and with hydraulic controls maintains each transducer at fixed distance to the pipe for sonically coupling thereto by a flowing liquid whereby a shear wave is generated by each beam in the tubular wall. The transducers comprise multiple pairs, the members of which are diametrically opposed and transmit in opposite directions, for transmitting longitudinally at angles of 12°, 27° and 42° to the pipe axis both clockwise and counterclockwise with one transducer of each pair disposed to transmit forward and the other reverse. For longitudinal flaws, one transducer of a pair transmits transverse clockwise and the other transverse counterclockwise. All transducers which transmit in a given direction are arrayed in the axial direction of the pipe. Pulsers simultaneously and repetitively energize and de-energize all forward transmitting transducers and after each such transmission pulsers simultaneously and repetitively energize and de-energize all reverse transducers. Reflection signals of predetermined strength are recorded and activate an alarm. A compressional wave transducer for determining wall thickness is included.

Russian Patent No. 2085935 for Method for ultrasonic flaw inspection of revolving parts by inventors Rimljand et al., filed Jan. 31, 1995 and issued Jul. 27, 1997, discloses ultrasonic vibrations excited in a part under inspection and, while part is rotating, signal excited by contactless method is measured at chosen point of part surface by means of off-line ultrasonic vibration transducer mounted on inspected part and passed remotely to computer storage, compared with similar signal excited under static conditions at same point of part surface and entered in computer storage; difference in signals indicates condition of part.

SUMMARY OF THE INVENTION

The present invention relates to nondestructive inspection of structural components of a test object. The present invention includes a plurality of transducers arranged on an end effector of a robotic arm configured to scan an object. The present invention generally includes an orthogonal transducer and one or more pitch-catch pairs of transducers. The present invention further includes the ability to rotate a test object and maintain a constant alignment with the surface of a rotating object and combine multiple scans to generate data indicating the integrity of the test object.

It is an object of this invention to provide a nondestructive testing system for internal and external inspection of the structural components of a test object to identify defects. It is a further object of the invention that the nondestructive testing system is used for both metallic and composite objects, as well as both non-axially symmetric and axially symmetric test objects. Prior art systems for nondestructive testing are limited to inspection of only symmetrical, tubular test objects, or are limited to only one type of ultrasonic scanning. Additionally, prior art systems require individual placement and adjustment of probes. None of the prior art discloses the ability to use a single robotic arm end effector to inspect a rotating test object using both a pulse-echo orthogonal transducer and paired pitch-catch transducers.

In one embodiment, the present invention is directed to a device for inspection of a test object, including an end effector, including a central ultrasonic transducer extending orthogonally outwardly from a center of a bottom surface of the end effector, a plurality of peripheral ultrasonic transducers extending outwardly and angled inwardly from a periphery of the bottom surface of the end effector, wherein the plurality of peripheral ultrasonic transducers includes a first pair of angled ultrasonic transducers oriented opposite each other, wherein each of the first pair of angled ultrasonic transducers is at an angle of less than 18° relative to an axis parallel to the central ultrasonic transducer, wherein the plurality of peripheral ultrasonic transducers includes a second pair of angled ultrasonic transducers oriented opposite each other, wherein each of the second pair of angled ultrasonic transducers is at an angle of between about 40° and about 45° relative to an axis parallel to the central ultrasonic transducer, and a robotic arm attached to the end effector operable to translate and rotate the end effector relative to a surface of a test object.

In another embodiment, the present invention is directed to a system for inspecting test objects, including a scanning device, including an end effector, including a central ultrasonic transducer extending orthogonally outwardly from a center of a bottom surface of the end effector, a plurality of peripheral ultrasonic transducers extending outwardly and angled inwardly from a periphery of the bottom surface of the end effector, wherein the plurality of peripheral ultrasonic transducers includes a first pair of angled ultrasonic transducers oriented opposite each other, wherein each of the first pair of angled ultrasonic transducers is at an angle of less than 18° relative to an axis parallel to the central ultrasonic transducer, wherein the plurality of peripheral ultrasonic transducers includes a second pair of angled ultrasonic transducers oriented opposite each other, wherein each of the second pair of angled ultrasonic transducers is at an angle of between about 40° and about 45° relative to an axis parallel to the central ultrasonic transducer, a robotic arm attached to the end effector operable to translate and rotate the end effector relative to a surface of a test object, and an axis rod, connected to an interior surface of a testing sink, extending into a hollow portion of the test object and operable to rotate the test object.

In yet another embodiment, the present invention is directed to a system for inspecting test objects, including a scanning device, including an end effector, including a central ultrasonic transducer extending orthogonally outwardly from a center of a bottom surface of the end effector, a plurality of peripheral ultrasonic transducers extending outwardly and angled inwardly from a periphery of the bottom surface of the end effector, a robotic arm attached to the end effector operable to translate and rotate the end effector relative to a surface of a test object, and an axis rod, connected to an interior surface of a testing sink, extending into a hollow portion of the test object and operable to rotate the test object, and at least one LiDAR sensor, at least one stereo depth camera, at least one ultrasonic alignment sensor, and/or at least one laser alignment sensor configured to detect a position and/or angle of the robotic arm relative to the test object, wherein the robotic arm is operable to automatically adjust a position and/or angle of the end effector to maintain the central ultrasonic transducer as orthogonal to the surface of the test object for the duration of a scan, and wherein the automatic adjustment of the position and/or the angle of the end effector is based off sensor data from the at least one LiDAR sensor, the at least one stereo depth camera, the at least one ultrasonic alignment sensor, and/or the at least one laser alignment sensor.

These and other aspects of the present invention will become apparent to those skilled in the art after a reading of the following description of the preferred embodiment when considered with the drawings, as they support the claimed invention.

DETAILED DESCRIPTION

Figure 1:
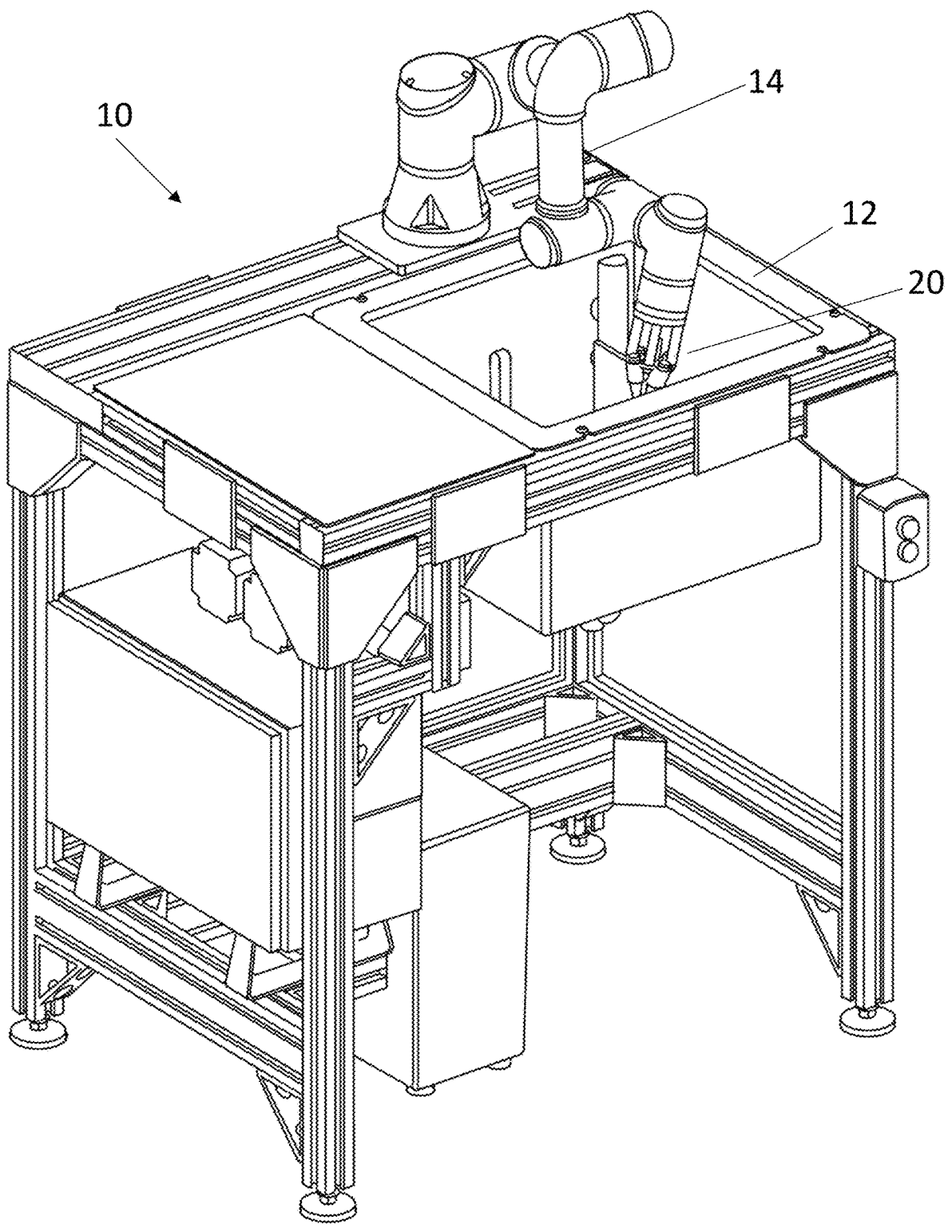
FIG. 1 illustrates a perspective view of a scanning apparatus according to one embodiment of the present invention.

The present invention is generally directed to nondestructive testing of test objects for inspection for structural integrity. The present invention includes a plurality of transducers arranged on an end effector of a robotic arm configured to scan a simultaneously rotating object. The present invention generally includes an orthogonal transducer and one or more pitch-catch pairs of transducers. The present invention further includes the ability to maintain a constant alignment with the surface of a rotating object and combine multiple scans to generate a complete inspection of the internal integrity of the test object. Further still, a preferred embodiment of the present invention utilizes immersion testing of objects to limit acoustic impedance of the sound waves used in ultrasonic testing.

In one embodiment, the present invention is directed to a device for inspection of a test object, including an end effector, including a central ultrasonic transducer extending orthogonally outwardly from a center of a bottom surface of the end effector, a plurality of peripheral ultrasonic transducers extending outwardly and angled inwardly from a periphery of the bottom surface of the end effector, wherein the plurality of peripheral ultrasonic transducers includes a first pair of angled ultrasonic transducers oriented opposite each other, wherein each of the first pair of angled ultrasonic transducers is at an angle of less than 18° relative to an axis parallel to the central ultrasonic transducer, wherein the plurality of peripheral ultrasonic transducers includes a second pair of angled ultrasonic transducers oriented opposite each other, wherein each of the second pair of angled ultrasonic transducers is at an angle of between about 40° and about 45° relative to an axis parallel to the central ultrasonic transducer, and a robotic arm attached to the end effector operable to translate and rotate the end effector relative to a surface of a test object.

In another embodiment, the present invention is directed to a system for inspecting test objects, including a scanning device, including an end effector, including a central ultrasonic transducer extending orthogonally outwardly from a center of a bottom surface of the end effector, a plurality of peripheral ultrasonic transducers extending outwardly and angled inwardly from a periphery of the bottom surface of the end effector, wherein the plurality of peripheral ultrasonic transducers includes a first pair of angled ultrasonic transducers oriented opposite each other, wherein each of the first pair of angled ultrasonic transducers is at an angle of less than 18° relative to an axis parallel to the central ultrasonic transducer, wherein the plurality of peripheral ultrasonic transducers includes a second pair of angled ultrasonic transducers oriented opposite each other, wherein each of the second pair of angled ultrasonic transducers is at an angle of between about 40° and about 45° relative to an axis parallel to the central ultrasonic transducer, a robotic arm attached to the end effector operable to translate and rotate the end effector relative to a surface of a test object, and an axis rod, connected to an interior surface of a testing sink, extending into a hollow portion of the test object and operable to rotate the test object.

In yet another embodiment, the present invention is directed to a system for inspecting test objects, including a scanning device, including an end effector, including a central ultrasonic transducer extending orthogonally outwardly from a center of a bottom surface of the end effector, a plurality of peripheral ultrasonic transducers extending outwardly and angled inwardly from a periphery of the bottom surface of the end effector, a robotic arm attached to the end effector operable to translate and rotate the end effector relative to a surface of a test object, and an axis rod, connected to an interior surface of a testing sink, extending into a hollow portion of the test object and operable to rotate the test object, and at least one LiDAR sensor, at least one stereo depth camera, at least one ultrasonic alignment sensor, and/or at least one laser alignment sensor configured to detect a position and/or angle of the robotic arm relative to the test object, wherein the robotic arm is operable to automatically adjust a position and/or angle of the end effector to maintain the central ultrasonic transducer as orthogonal to the surface of the test object for the duration of a scan, and wherein the automatic adjustment of the position and/or the angle of the end effector is based off sensor data from the at least one LiDAR sensor, the at least one stereo depth camera, the at least one ultrasonic alignment sensor, and/or the at least one laser alignment sensor.

None of the prior art discloses a system for nondestructive testing of metal and composite parts using a mobile robotic arm equipped with both pitch-catch and pulse-echo transducers for scanning a simultaneously rotating part, wherein the robotic arm is capable of maintaining alignment with the surface of the test object and the object is immersed.

Many methods of investigating the integrity of machinery and mechanical parts are known to the art. One method of inspection is destructive testing (DT), which causes the damage or destruction of a specimen to evaluate properties of the test object (e.g., repeated crash testing to determine the durability of a metal frame). Alternatively, nondestructive testing (NDT) is a method of testing a subject which does not necessitate the damage or destruction of the test object. Nondestructive testing is advantageous in the inspection of objects which are expensive or time consuming to manufacture, as testing can be completed quickly and does not require the replacement of the damaged part.

Many nondestructive testing processes are used to determine the properties of a test object beyond those properties which are quantifiable by simple observation. One method of inspecting the internal quality of a test object is ultrasonic testing (UT). Ultrasonic testing is conducted by focusing ultrasonic waves (i.e., sound waves with a frequency above about 10 kHz) on a test object and measuring the sound waves that are reflected off the material. In some forms of UT testing, the time required for the sound wave to travel through the test object is measured and used to evaluate the integrity of the test object. Other NDT methods using ultrasonic waves include ultrasonic resonance testing, wherein imperfections within a test object cause the frequency of applied resonant ultrasonic waves to shift therefore indicating a flaw in the integrity of the test object.

Ultrasonic testing is conducted to evaluate various properties of a specimen, including material thickness, welding integrity, and compromised internal surfaces. If there is a defect in the material, the flaw will alter the intensity and/or the phase of the reflected sound wave and the data from the transducers will indicate the imperfection. This is advantageous over destructive testing methods as the system evaluates the integrity of a subject without compromising or destroying the subject. Further, ultrasonic inspection is advantageous as parts wear over time and the defects are not always obvious based on observation or inspection of the object using destructive testing methods.

Ultrasonic transducers are able to be arranged in various positions. In a pitch-catch arrangement, a pair of angled transducers are used to emit and detect ultrasonic waves. One transducer, the pitcher, emits the sound wave energy and the other transducer, the catcher, receives the reflected sound waves. This is advantageous for locating flaws at various depths within the test object. Another transducer arrangement, referred to as the pulse-echo transducer, emits ultrasonic waves through a single transducer which then receives the reflected sound wave energy. This configuration is advantageous for pinpointing the precise location of a flaw within the test object, but the pulse-echo transducer alone is limited in the orientation and depth of the flaws it is capable of detecting (i.e., cracks perpendicular to the surface of the test object would not be detected by a single pulse-echo transducer).

In some ultrasonic inspection methods, such as the resonant acoustic method (RAM), the ultrasound waves encounter significant difference in acoustic impedance between the air and the test object. This causes a precipitous drop in intensity of the sound waves, thereby limiting the quality of results. One method of overcoming this impedance differential is to immerse the test objects in water, as water is much closer in impedance to the acoustic membrane of the transducer. In immersion testing, the transducer is situated in the water and emits ultrasonic waves to the test object which is immersed. The waves travel through the water, are reflected off the test object, and are then received by the transducer. The presence of the water reduces energy loss for the sound waves relative to the use of air as the coupling medium. This method of ultrasonic testing is advantageous over air based methods because immersion testing allows for greater resolution when inspecting curved and rough surfaces of subjects.

Additional methods of ultrasonic testing include the use of electromagnetic acoustic transducers (EMAT) to generate magnetic fields in electrically conducive test objects. In this non-immersive NDT method, an alternating current is passed through an electric coil at ultrasonic frequency to generate an alternating current magnetic field. A magnetic transducer is used to induce an additional magnetic field within the test object. When the two magnetic fields interact within the test object, an ultrasonic acoustic wave is generated and detected by the EMAT. In comparison to RAM, EMAT is a non-contact method of NDT. It is advantageous for NDT under certain environmental circumstances (i.e., on sight testing in freezing temperatures) but encounters significant attenuation of ultrasonic waves due to the lack of couplant used.

Another method of nondestructive testing is eddy current testing (ET), which is used to detect defects in surface and subsurface components of a test object. In eddy current testing, one or more probes generate a circular-flowing, eddy-like current in an adjacent, electrically conductive structure that is affected by defects. The resulting local change in the field created by the eddy current path modification (due to the defect) is sensed by the transmitting or receiving coil.

Prior art fails to disclose ultrasonic testing of an immersed, rotating test object by a robotic arm equipped with ultrasonic sensors. It is a distinct advantage of the present invention to use a robotic arm equipped with a variety of transducer types and arrangements in order to completely scan the entire test object. The robotic arm of the present invention provides mobility and range to scan objects that are axially symmetric as well as those that are not axially symmetric. Additionally, prior art fails to disclose a system for ultrasonic testing of an object wherein the test object is either made of metal or composite material, as well as either axially or nonaxially symmetric. Further, prior art fails to disclose such a system that uses a combination of pulse-echo and pitch-catch transducers to create a complete scan of a test object.

Some prior art methods of ultrasonic testing disclose ultrasonic scanning of a rotating, mechanical part, as in the case of U.S. Pat. Nos. 6,748,808, 6,769,957 and 9,027,405. However, the technology described in these prior art references are not compatible with an immersion system, requiring these systems to feed in other external sources of couplant. The ultrasonic frequencies used in non-immersive methods of ultrasonic testing attenuate quickly in air. This attenuation limits the resolution of sound waves traveling from the transducer to a test object and back to a transducer, thus inhibiting the ultrasonic detection of the internal properties of the test object. It is an advantage of the present invention to provide a tank for immersion of a test object in order to limit acoustic impedance and generate more accurate test results. Additionally, the '957 patent includes a system of transducers mounted in a holder that scans a level, axially symmetric test object as the object is rotated. However, the mounting assembly is stationary as the object is scanned and the angle of the transducers must be adjusted by hand. Thus, the system of '957 is not capable of scanning objects that are not smooth and axially symmetric, as the holder which maintains surface contact between the transducers and the test object is level and stationary. Further, the probes of the '405 patent must be attached to the surface of the test object for direct coupling as the object is rotated, while the transducers remain stationary. It is a significant advantage of the present invention to provide a method of scanning a test object that adjusts to the surface features of the object in such a way that prepositioned transducers are able to quickly scan along the length of the object from multiple angles, allowing for the testing of objects that are not axially symmetric.

Other prior art discloses the ability to ultrasonically scan an immersed, rotating object wherein the rotating object is axially symmetric, as in the case of U.S. Pat. Nos. 10,739, 312, 7,874,212, and 5,007,291. However, these prior art systems, as well as U.S. Pat. No. 6,748,808, are limited to the scanning of axially symmetric objects, including pipes, axels, and, in the case of the '312 patent, spherical bodies. The systems of the prior art are not capable of conducting ultrasonic testing on a part which is not axially symmetric, as transducers of the prior art systems are fixed or mounted in place, such as in the case of the '312 patent, which discloses an arrangement of transducers such that the arrangement prohibits the testing of objects which are not sufficiently spherical. The system of the present invention advantageously accounts for both nonaxial symmetry and nonconstant cross sectional thickness of certain test objects and is capable of scanning those objects where prior art is limited.

Some prior art discloses methods of immersive ultrasonic testing of a rotating metal subject, as in the case of U.S. Pat. Nos. 7,874,212, 8,365,603, and 8,265,886. However, these methods for ultrasonic testing are limited to subjects made of metal (e.g. metal pipes). It is becoming increasingly common to use composite materials in the manufacturing industry as composites are lightweight in comparison to metal and are more durable than other existing polymers. In the field of aviation in particular, it is advantageous to use materials constructed of composites such as carbon fiber rather than use only metal parts, as the lightweight composites create a more aerodynamically favorable machine. Thus, it is an advantage of the present invention to use ultrasonic testing capable of inspecting both composite and metal test objects.

While some prior art discloses ultrasonic immersion testing of a rotating composite, as in the case of U.S. Pat. No. 6,941,231, the test object is a sample of a cement composite applied to the annular space of an oil well and scanning is conducted using only separate transmitting and receiving transducers. The present invention is advantageous over the '231 patent because the present invention uses not only paired, pitch-catch transducers, but also an orthogonal pulse-echo transducer in order to accurately determine the location of a structural flaw in the test object and increase the sensitivity of the testing process. Further, the present invention utilizes a robotic arm equipped with both pitch-catch transducers and an orthogonal pulse-echo transducer in order to move along the length of the test object as it is rotated.

Additionally, prior art is limited in the number of ultrasonic transducers and direction of ultrasonic waves, as in the case of Russian Patent No. 2085935, U.S. Pat. Nos. 8,365, 603, and 7,874,212. One advantage of the present invention is the multimodality of the combined transducer arrangements on the robotic arm end effector, including both orthogonal and angled transducers which can be moved in any direction along the length of the rotating test object. The system of the '935 patent discloses only a single transducer which both emits and receives the ultrasonic waves in a pulse-echo arrangement. However, the use of only a single transducer limits the range of the ultrasonic scan and cannot detect significantly subsurface flaws. Additionally, the '212 patent discloses an array of ultrasonic probes for angle beam flaw detection. In this system for angle beam flaw detection, the probe array is limited in the direction of the ultrasound waves and, as in the case of the '603 patent, lacks a single, directly orthogonal pulse-echo transducer. The present invention is advantageous over these systems, as the present invention combines several methods of ultrasonic testing, including pulse-echo scans by an orthogonal transducer, pitch-catch scans using circumferential shear waves, and pitch-catch scans using refracted L-waves to examine both near-surface and subsurface components of a test object. One particular advantage of the present invention is the ability to use the corner effect mechanism to detect cracks along the back wall of a test object that extend in any direction. A system using only a single, orthogonal transducer or only angle beam detection is limited in the orientation of the flaws detected.

Further, prior art is limited in the movement of test objects, as in the case of U.S. Pat. Nos. 11,408,861 and 6,070,466. The '861 patent discloses a method for inspecting railroad tracks via rail testing trains with ultrasonic probes. The rails of this system are laid, and the ultrasonic probes scan the immobile metal rails as the testing train moves unidirectionally down the track. As a result, the system of the '861 patent is significantly limited in detecting structural flaws in the underside of the rails, as the rails cannot be moved or shifted to be inspected from a different angle. Additionally, the '466 patent does not disclose a method for moving the test object as inspection occurs. Rather, this patent inspects the thickness and bond integrity of a parent metal piece with a clad metal layer. Thus, the system of the present invention is advantageous over the prior art, as the test object of the present invention is rotated to completely scan the object and create a comprehensive report on the integrity of the part at varying depths and locations.

Referring now to the drawings in general, the illustrations are for the purpose of describing one or more preferred embodiments of the invention and are not intended to limit the invention thereto.

FIG. 1 illustrates a preferred embodiment of the present invention. The system 10 has a sink 12 for immersion of a test object. The robotic arm 14 has end effector 20 which pivots above sink 12 to conduct testing on subjects within the sink 12. In one embodiment, the sink 12 is filled with water for ultrasonic immersion testing. In one embodiment, the sink 12 is filled with a fluid sufficient to limit the attenuation of ultrasonic sound waves. One of ordinary skill in the art will appreciate that the objective of limiting the acoustic impedance of the sound waves can be accomplished through the use of a variety of mediums. In another embodiment, the sink is not filled with a fluid for limiting the attenuation of ultrasonic sound waves. In one embodiment, the end effector of the system of the present invention is attached to a couplant supply and recovery system, wherein couplant is applied to the test object to prevent attenuation of the ultrasonic waves. As couplant is applied to the object, it is caught in the sink and recovered by the couplant system.

In one embodiment, the robotic arm of the present invention is mounted to a rail system, allowing for movement of the robotic arm. In one embodiment, the arm is mounted to an xy dual axis rail system. In one embodiment, the robotic arm of the present invention is mounted to a linear rail system. In one embodiment, the robotic arm is secured to the sink for testing objects using a detachable locking mechanism (e.g., a twist and lock system wherein the robotic arm is inserted into a cavity and rotated a number of degrees after which point a pin or pins secure the robotic arm in place). In another embodiment, the robotic arm permanently mounted to the sink. In one embodiment, the robotic arm is operable to be mounted to a portable base using a detachable locking mechanism.

Figure 2:
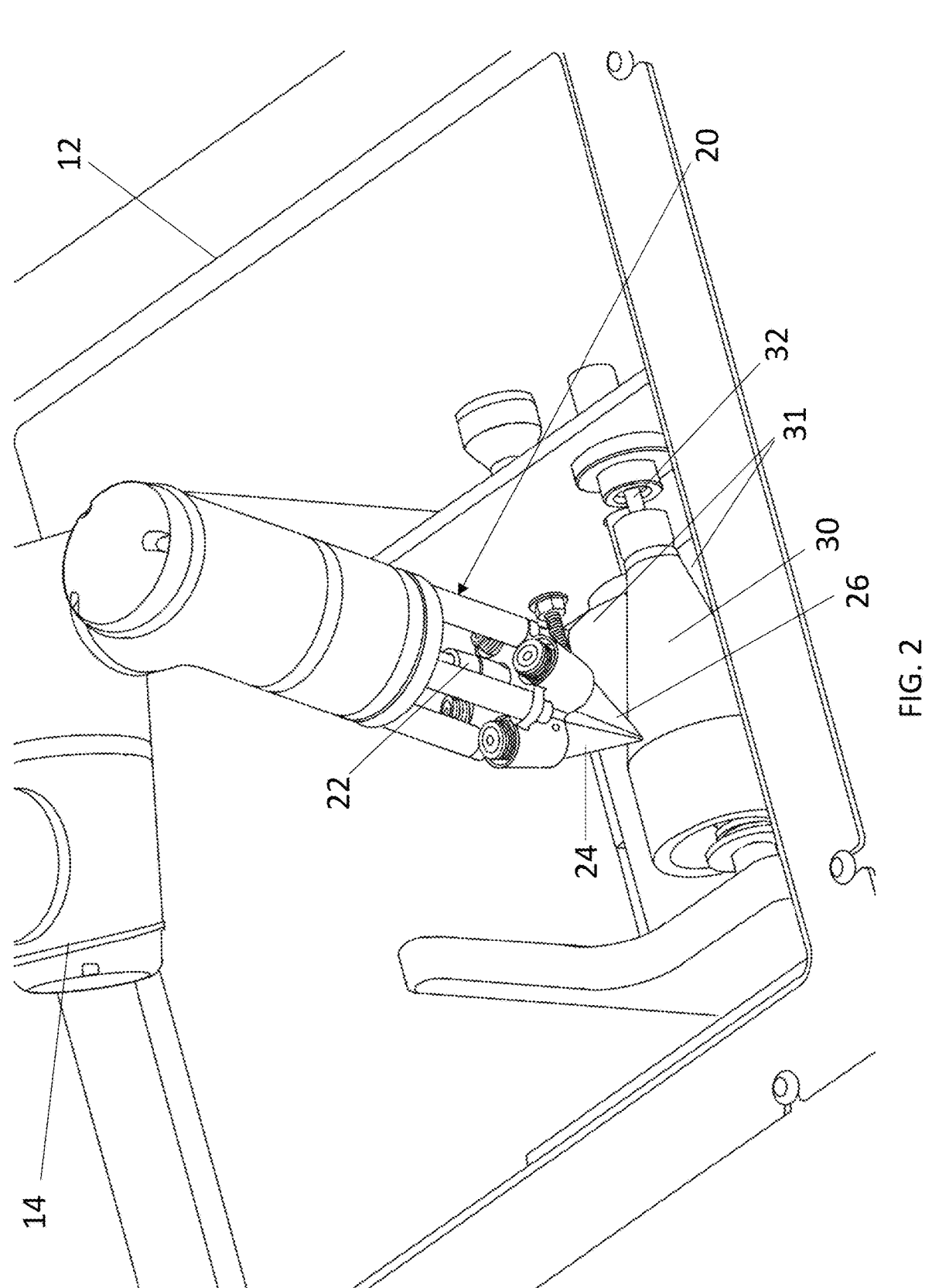
FIG. 2 illustrates perspective view of a system for scanning a rotating object according to one embodiment of the present invention.

FIG. 2 depicts a perspective view of the preferred embodiment of the present invention. The end effector 20 of the robotic testing arm 14 includes a plurality of transducers 22, 24, and 26, where one transducer 22 is an orthogonal transducer and additional transducers 24, 26 are angled transducers along an outer edge of the end effector 20. The idlers 31 located in the sink 12 maintain the rotational energy of the test object 30 while the axis rod 32 secures the test object 30 within the sink 12. A motor powers the rotation of axis rod 32. As the axis rod 32 rotates, the idlers 31 ensure that the test object maintains a constant rotational energy. In one embodiment, the test object 30 is secured by the axis rod 32 such that the test object 30 maintains contact with the idlers 31. In another embodiment, the test object 30 is secured by compression plates located on the end of two horizontal axis rods which compress both ends of the test object 30 and are rotated by a motor attached to the axis rod. In another embodiment, the axis rod 32 is inserted through a hollow test object and secured in the sink 12 in such a way that the test object 30 maintains contact with the idlers 31. Use of compression plates allows the system to be used for objects without substantially hollow components, wherein the axis rod 32 is required to be inserted, allowing the system to scan a larger variety of parts. In one embodiment, a test object with a uniform geometry is placed on the idlers 31 without using a compression plate or axis rod to secure the object. The idlers 31 then rotate the uniformed geometric object.

In one embodiment, the test object 30 is axially symmetrical. In another embodiment, the test object 30 is non axially symmetrical. In one embodiment, the test object 30 is both nonaxial symmetry and has a nonconstant cross sectional thickness. In one embodiment, the test object 30 is a metal object. In one embodiment, the test object 30 is a composite material. One of ordinary skill in the art will appreciate the variety of composite materials used to construct mechanical parts which require nondestructive testing, including fiberglass-reinforced plastics, carbon fiber-reinforced plastics, and other materials. For example, it is common in the aeronautics industry to use carbon fiber composites to reduce weight and thereby improve the efficiency of the aircraft. Carbon fiber composites are susceptible to laminar cracks and voids in layering, as well as other defects and inclusions, and it is an advantage of the present invention to be capable of inspecting carbon fiber and other composite parts for internal flaws and features.

The robotic arm end effector 20 scans the test object 30 as the test object is rotated in order to inspect the entire mechanical part without the need to adjust the test object or reposition the transducers on the end effector. In a preferred embodiment, this inspection is an ultrasonic inspection. One of ordinary skill in the art will recognize the advantage of rotating a test object while scanning the test object in order to completely scan the object using a robotic arm end effector with a variety of sensors and sensor arrangements, especially with regard to thicker parts, the full thickness of which are unable to be scanned from a single direction.

In a preferred embodiment, the robotic arm end effector is equipped with ultrasonic transducers for ultrasonic testing of an object. Ultrasonic testing includes but is not limited to pulse-echo, pitch-catch, and through transmission ultrasonic (TTU) testing. The present invention is advantageously constructed to enable pulse-echo, pitch-catch, through transmission ultrasonic (TTU) testing, and any combination thereof. In one embodiment, inspection is conducted using ultrasonic transducers equipped for resonance testing and/or EMATs. In one embodiment, inspection is conducted using eddy current testing. In one embodiment, the end effector of the robotic arm is equipped with eddy current sensors for eddy current testing of an object. In one embodiment, the ultrasonic transducers of the end effector are operable to be replaced with transducers for eddy current testing, RAM, EMATs, laser shearography, microwave NDT, and/or terahertz imaging.

In one embodiment of the present invention, the robotic arm of the present invention places the transducers in contact with the surface of the test object. In one embodiment of the present invention, the transducers on the end effector of the robotic arm are airborne (i.e., do not contact the surface of the test object). In one embodiment, the pitch-catch transducers are airborne transducers (i.e., not couplant coupled transducers). In one embodiment, the orthogonal pulse-echo transducer is equipped for non-contact laser UT.

In one embodiment, the robotic arm end effector is detachable from the robotic arm and operable to be replaced. In one embodiment, the robotic arm end effector is secured to the robotic arm using a locking mechanism (e.g., a twist and lock system wherein the robotic arm is inserted into a cavity and rotated a number of degrees after which point a pin or array of pins secure the robotic arm in place). The end effector is then operable to be released from the locking mechanism and replaced. In one embodiment of the present invention, the end effector is operable to be replaced with an end effector according to one embodiment of the present invention with transducers configured for eddy current testing, RAM, EMATs, laser shearography, microwave NDT, and/or terahertz imaging.

In one embodiment, the robotic arm end effector is operable to be replaced with a second end effector configured to grip test objects. In one embodiment, replacement of the end effector is done manually. In one embodiment, the end effector is replaced automatically by the robotic arm. In one embodiment, the end effector with transducers is equipped with extensions for picking up and placing a test object (e.g., extensions protruding from radially symmetric points to form a claw-like gripping mechanism). In one embodiment, the second end effector is attached to a second robotic arm. This is advantageous for rapid, consecutive inspection of test objects. For example, the system of the present invention is operable to be used to inspect objects on a production line, where the gripping end effecter is used to remove a test object from the production line and place the object in the sink. The robotic arm end effector equipped with transducers is then operable to conduct inspection of the test objects. This effectively reduces the input required on the part of a user and therefor increases efficiency of inspection for multiple test objects.

In one embodiment, the robotic arm 14 includes an alignment sensor which detects the orientation of the test object 30 and wirelessly communicates the orientation of the test object 30 to robotic arm end effector 20. In another embodiment, the alignment sensor for detection of the orientation of the test object is located on the end effector 20. The robotic arm end effector 20 then pivots relative to the surface of the rotating test object and moves in such a way that the orthogonal transducer 22 of the robotic arm end effector 20 maintains a directly orthogonal configuration with the surface of the rotating test object as scanning is conducted. In one embodiment, the alignment sensor includes at least one laser sensor. In another embodiment, the alignment sensor includes at least one ultrasonic transducer. In a further embodiment, the alignment sensor is capable of determining the orientation of the surface of the test object. In one embodiment, the robotic arm adjusts in real time to the orientation of the test object detected by the alignment sensor. In another embodiment, the robotic arm follows a predetermined routine of movement based on a three-dimensional rendering of the test object.

In one embodiment, the system of the present invention receives a 3-dimensional rendering of the object generated by a three-dimensional rendering software (i.e., computer aided design (CAD), photogrammetry, surface modeling, wireframe modeling, or any three-dimensional imaging software known to one of ordinary skill in the art) and automatically determines a route for the movement of the robotic arm based on the 3-dimensional rendering of the object. In another embodiment, the system of the present invention renders a 3-dimensional image of the object using a sensor array located within the sink 12 and automatically determines a route for the movement of the robotic arm based on the 3-dimensional rendering of the object. In this embodiment, the rendering of the 3-dimensional image of the test object by the system of the present invention is generated using one or more LiDAR sensors, LASER pulse scanning, stereo depth camera, or a similar technique known to the art of three-dimensional sensing. The three dimensional sensing of the system of the present invention is advantageous for accounting for subtle manufacturing variances between a 3-dimensional model generated by the manufacturer of a test object and the actual 3-dimensional structure of a specific test object. In one embodiment, the one or more LiDAR sensors and/or one or more stereo depth cameras are attached to the end of the end effector, to the robotic arm, and/or to an interior surface of the sink.

In one embodiment, the system receives a predetermined, automated routine for the robotic arm based on a three-dimensional image of the test object without receiving or rendering a three-dimensional image of the test object. In one embodiment, the predetermined, automated routine includes a set of movements and adjustments to the robotic arm over a preset period of time. In one embodiment, the routine is manually input into a user device and transmitted to the robotic arm system via the wireless network device. In another embodiment, the routine is directly uploaded to the robotic arm system from a remote server.

Figure 3A:
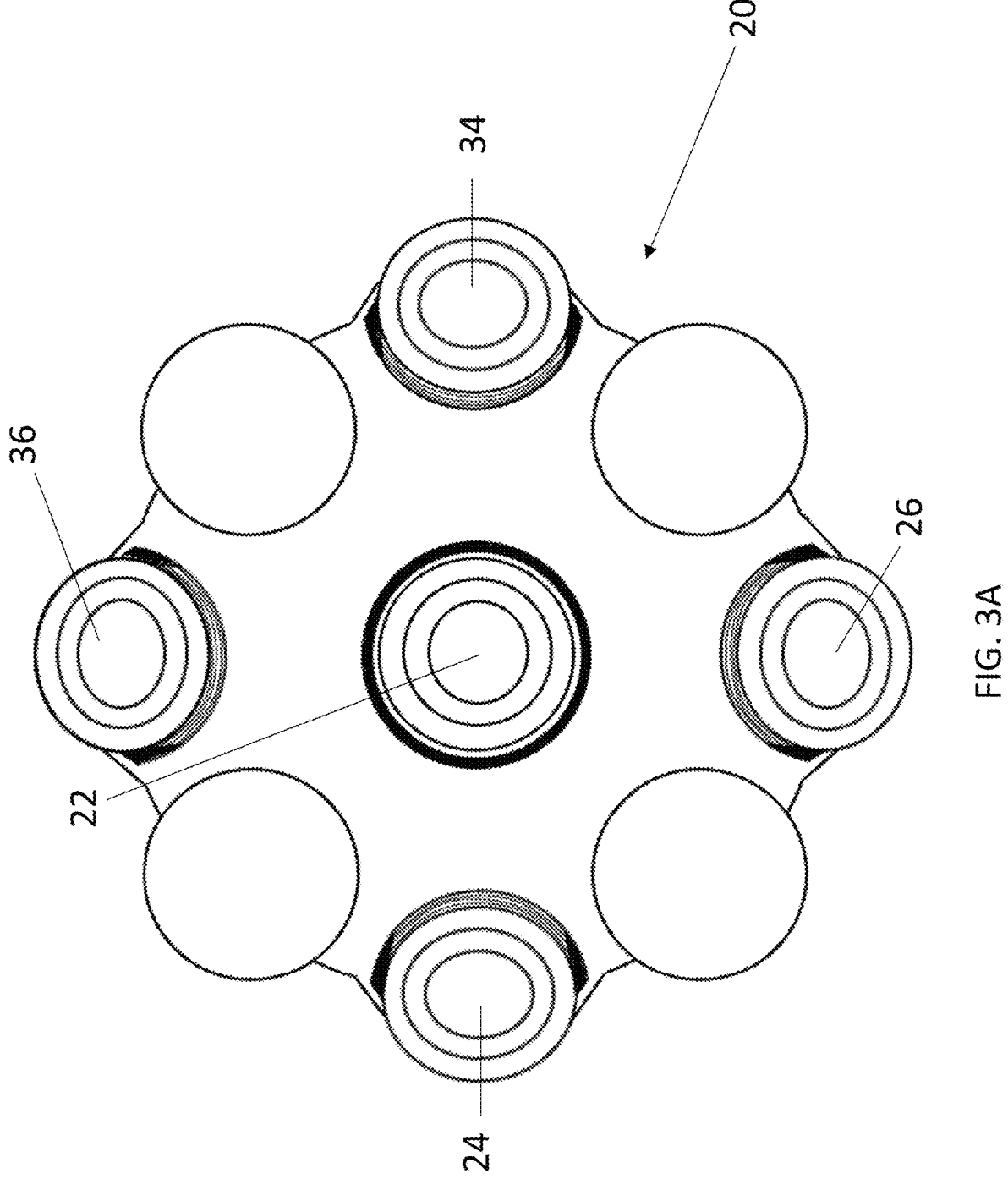
FIG. 3A illustrates a sectional top view of the end effector of the present invention.
Figure 3B:
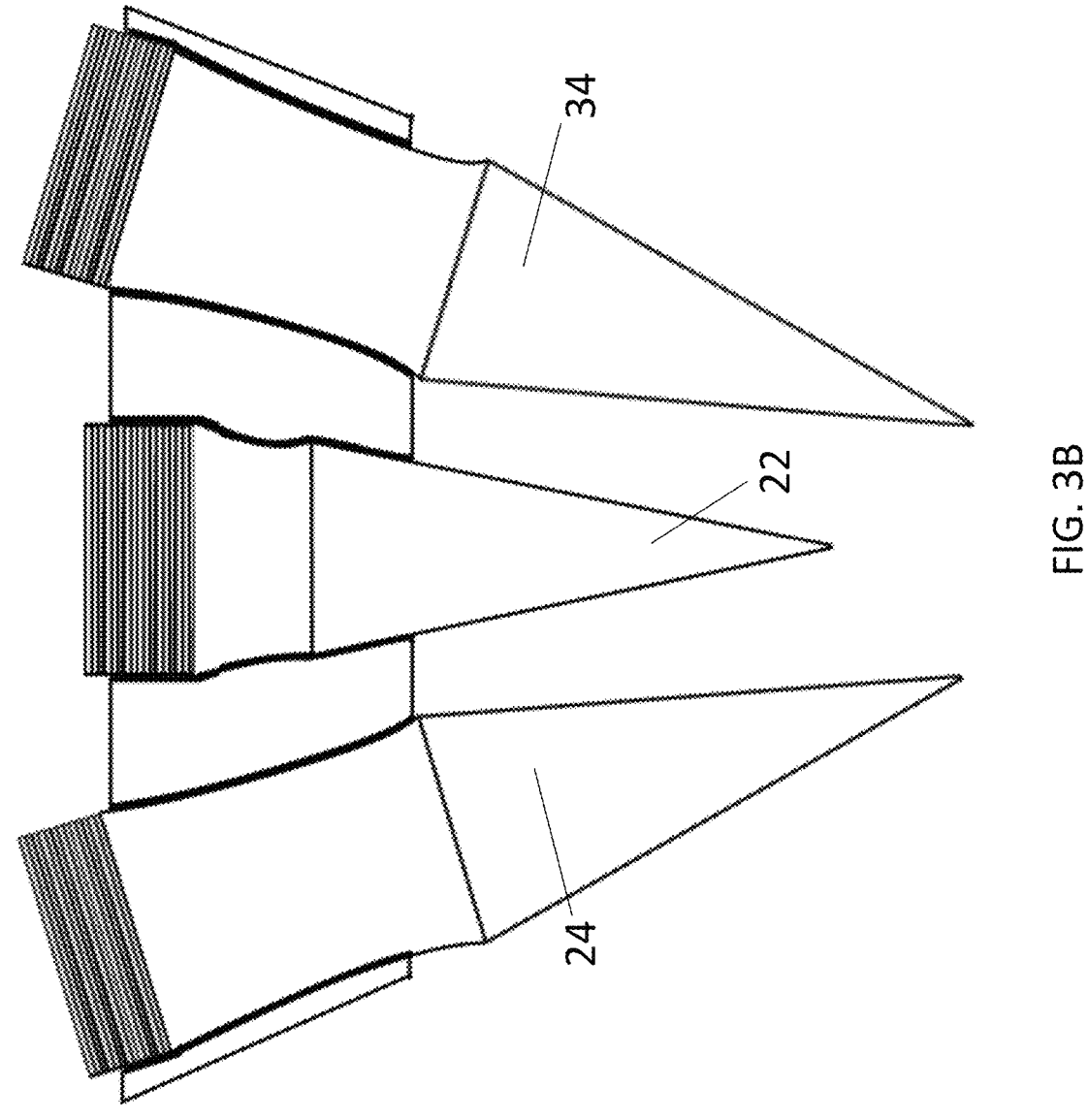
FIG. 3B illustrates a sectional side view of the end effector of the present invention.

FIGS. 3A and 3B depict the transducer orientation of the present invention. Transducer 22 is an orthogonal transducer while transducers 24, 26, 34, 36 are angled transducers locate along an outer edge of the robotic arm end effector 20. In a preferred embodiment, transducers 24 and 34 are in a pitch-catch orientation where one transducer emits the ultrasonic wave towards the test object and the other transducer receives the reflected ultrasonic wave. In a preferred embodiment, transducers 26 and 36 are in a pitch-catch orientation where one transducer emits the ultrasonic wave towards the test object and the other transducer receives the reflected ultrasonic wave. In a preferred embodiment, transducers in a pitch-catch orientation are operable to emit and receive an ultrasonic wave (i.e., a transducer which emits the ultrasonic wave in a first scan is then operable to receive an ultrasonic wave in a second scan). In a preferred embodiment, one pitch-catch transducer pair conducts ultrasonic testing using circumferential shear waves and a second pitch-catch transducer pair conducts ultrasonic testing using refracted L-waves. In one embodiment, scans are conducted simultaneously. In another embodiment, scans are conducted sequentially. In one embodiment, the sequential scans are conducted with a difference of less than one microsecond between scans.

One of ordinary skill in the art will appreciate that the pitch-catch pairs must be angled to such a degree that the ultrasonic wave emitted by the pitching transducer is reflected off the test object and received by the catching transducer. In a preferred embodiment, a first pitch-catch transducer pair uses refracted L-waves and has transducers angled between 0 and 18 degrees (with the angle defined between a central axis of one of the transducers and an axis parallel to the orthogonal transducer) while a second pitch-catch transducer pair uses shear waves and has transducers angled between 40 and 45 degrees (with the angle defined between a central axis of one of the transducers and an axis parallel to the orthogonal transducer).

In one embodiment, the orthogonal transducer is equipped with both a pulser element for emitting ultrasonic waves to a test object and a receiver element for receiving the reflected ultrasonic waves from the test object. In one embodiment, the orthogonal transducer emits an ultrasonic wave to the test object. The ultrasonic wave is then reflected back to the orthogonal transducer according to the pulse-echo technique for ultrasonic NDT. Defects in the test object are indicated by an anomaly in the reflected ultrasonic waves received by the receiving element of the orthogonal transducer. In one embodiment, the axis rod of the present invention houses an array of receiving elements. In one embodiment, the axis rod houses a single receiving element. In one embodiment, the movement of the single receiving element located on the axis rod is programmed to maintain linear coordination with the robotic arm and/or orthogonal transducer. As ultrasonic waves are emitted from the orthogonal transducer, the waves travel through the object and are detected by the receiving element or array of receiving elements housed in the axis rod using a through transmission ultrasonic (TTU) testing method.

In a preferred embodiment, scans taken by the robotic arm end effector are transmitted via wireless network connection to a handheld user device. In one embodiment, scan data is generated and wirelessly transmitted to the handheld user device in real time, advantageously allowing a user to detect flaws in a test object before total scanning is complete. This is advantageous for testing of several objects in succession, as the user would not need to wait for the scan to be completed before receiving a notification or indication of a flaw and quickly replace the first test object with a second test object to begin scanning. In this way, the present invention can rapidly inspect large quantities of objects to determine and designate the test objects that are flawed.

In one embodiment, the scans taken by the robotic arm end effector are stored on a wireless remote server and accessed later. In a preferred embodiment, scans taken using different wavelengths are compiled into a single report and displayed on the handheld user device. In one embodiment, scans are individually displayed on the handheld user device. In one embodiment, the handheld user device receives a selection of desired wavelength or transducer types to scan the object and wirelessly communicates the desired wavelength or transducer types to the robotic arm and robotic arm end effector. In one embodiment, the device generates an alert when a flaw is detected and displays the scan data indicating a flaw and/or an abbreviated summary of the flaw on the screen of the user device. In one embodiment, the system of the present invention is programmed to include a red, yellow, and green lighting system for indication of scanning results. Scanning results are indicated by a color-coded light system corresponding to the result of the inspection. In one embodiment, the light is displayed on the handheld user device. In one embodiment, the light is red to indicate a flawed test object, yellow to indicate the test object requires further inspection, and green to indicate that no flaws were detected in the test object. Color variation of the color-coded light system is achieved by a GUI display, colored coverings of the light system, color changing bulbs, or any method of varying a lighted display known in the art.

In a preferred embodiment, the robotic arm end effector completely scans a test object in less than 30 seconds. In another embodiment, scanning of the test object by the robotic arm end effector is completed in less than 45 seconds. In another embodiment, scanning of the test object by the robotic arm end effector is completed in less than 60 seconds.

Figure 4:
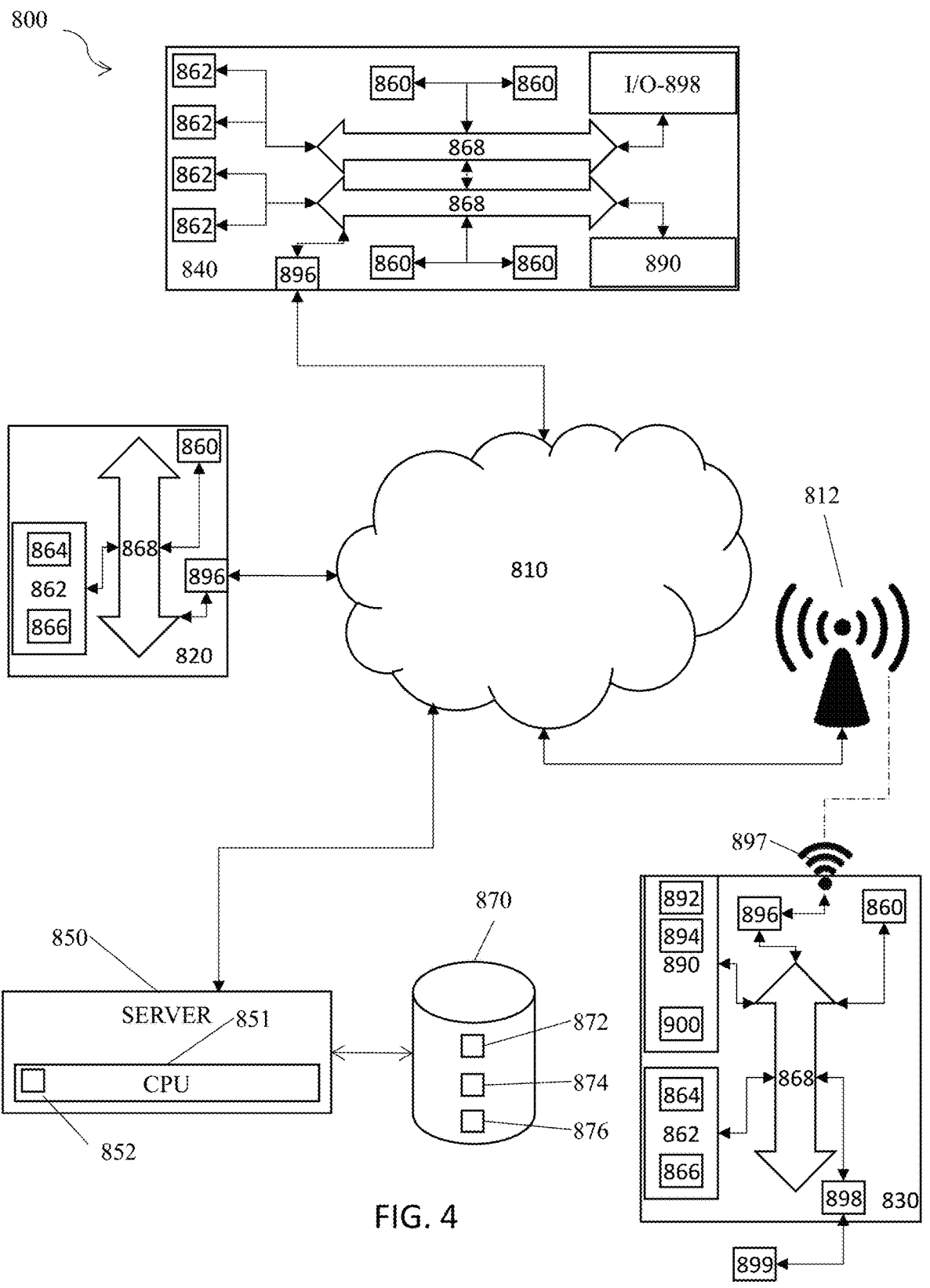
FIG. 4 is a schematic diagram of a system of the present invention.

FIG. 4 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICRO-WAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 4, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 4, is operable to include other components that are not explicitly shown in FIG. 4, or is operable to utilize an architecture completely different than that shown in FIG. 4. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A device for inspection of a test object, comprising:
   an end effector, including:
   a central ultrasonic transducer extending orthogonally outwardly from a center of a bottom surface of the end effector;

a plurality of peripheral ultrasonic transducers extending outwardly and angled inwardly from a periphery of the bottom surface of the end effector;

wherein the plurality of peripheral ultrasonic transducers includes a first pair of angled ultrasonic transducers oriented opposite each other, wherein each of the first pair of angled ultrasonic transducers is at an angle of less than 18° relative to an axis parallel to the central ultrasonic transducer;

wherein the plurality of peripheral ultrasonic transducers includes a second pair of angled ultrasonic transducers oriented opposite each other, wherein each of the second pair of angled ultrasonic transducers is at an angle of between about 40° and about 45° relative to an axis parallel to the central ultrasonic transducer; and a robotic arm attached to the end effector operable to translate and rotate the end effector relative to a surface of a test object.

2. The device of claim 1, wherein the robotic arm is operable to automatically adjust a position and/or angle of the end effector to maintain the central ultrasonic transducer as orthogonal to the surface of the test object for the duration of a scan.

3. The device of claim 2, wherein the automatic adjustment of the position and/or the angle of the end effector is based off sensor data from at least one LiDAR sensor, at least one stereo depth camera, at least one ultrasonic alignment sensor, and/or at least one laser alignment sensor.

4. The device of claim 1, the robotic arm is operable to receive, via wireless or wired network connection, a scan routine from at least one user device, and wherein the robotic arm moves in accordance with the scan routine.

5. The device of claim 1, wherein the end effector is positioned within a coupling fluid filled sink.

6. The device of claim 1, wherein a scan conducted by the device is performed in less than 45 seconds.

7. The device of claim 1, wherein the first pair of ultrasonic transducers operates in a pitch-catch configuration where, at any given point during a scan, one of the first pair of ultrasonic transducers acts as a transmitting device and the other of the first pair of ultrasonic transducers acts as a receiving device.

8. The device of claim 1, wherein the second pair of ultrasonic transducers operates in a pitch-catch configuration where, at any given point during a scan, one of the second pair of ultrasonic transducers acts as a transmitting device and the other of the second pair of ultrasonic transducers acts as a receiving device.

9. A system for inspecting test objects, comprising:
a scanning device, including:
an end effector, including:
a central ultrasonic transducer extending orthogonally outwardly from a center of a bottom surface of the end effector;
a plurality of peripheral ultrasonic transducers extending outwardly and angled inwardly from a periphery of the bottom surface of the end effector;
wherein the plurality of peripheral ultrasonic transducers includes a first pair of angled ultrasonic transducers oriented opposite each other, wherein each of the first pair of angled ultrasonic transducers is at an angle of less than 18° relative to an axis parallel to the central ultrasonic transducer;
wherein the plurality of peripheral ultrasonic transducers includes a second pair of angled ultrasonic transducers oriented opposite each other, wherein each of the second pair of angled ultrasonic transducers is at an angle of between about 40° and about 45° relative to an axis parallel to the central ultrasonic transducer;

a robotic arm attached to the end effector operable to translate and rotate the end effector relative to a surface of a test object; and an axis rod, connected to an interior surface of a testing sink, extending into a hollow portion of the test object and operable to rotate the test object.

10. The system of claim 9, further comprising at least one idler positioned within the testing sink beneath the axis rod, wherein the at least one idler is configured to maintain a constant rotational speed of the test object during a scan.

11. The system of claim 9, wherein the robotic arm is operable to automatically adjust a position and/or angle of the end effector to maintain the central ultrasonic transducer as orthogonal to the surface of the test object for the duration of a scan.

12. The system of claim 11, wherein the automatic adjustment of the position and/or the angle of the end effector is based off sensor data from at least one LiDAR sensor, at least one stereo depth camera, at least one ultrasonic alignment sensor, and/or at least one laser alignment sensor.

13. The system of claim 9, the robotic arm is operable to receive, via wireless or wired network connection, a scan routine from at least one user device, and wherein the robotic arm moves in accordance with the scan routine.

14. The system of claim 9, wherein the testing sink is filled with a coupling fluid and wherein the end effector is positioned within the coupling fluid of the testing sink for the duration of a scan of the test object.

15. The system of claim 9, wherein the first pair of ultrasonic transducers operates in a pitch-catch configuration where, at any given point during a scan, one of the first pair of ultrasonic transducers acts as a transmitting device and the other of the first pair of ultrasonic transducers acts as a receiving device.

16. The system of claim 9, wherein the second pair of ultrasonic transducers operates in a pitch-catch configuration where, at any given point during a scan, one of the second pair of ultrasonic transducers acts as a transmitting device and the other of the second pair of ultrasonic transducers acts as a receiving device.

17. A system for inspecting test objects, comprising:
a scanning device, including:
an end effector, including:
a central ultrasonic transducer extending orthogonally outwardly from a center of a bottom surface of the end effector;
a plurality of peripheral ultrasonic transducers extending outwardly and angled inwardly from a periphery of the bottom surface of the end effector;
a robotic arm attached to the end effector operable to translate and rotate the end effector relative to a surface of a test object;
an axis rod, connected to an interior surface of a testing sink, extending into a hollow portion of the test object and operable to rotate the test object; and
at least one LiDAR sensor, at least one stereo depth camera, at least one ultrasonic alignment sensor, and/or at least one laser alignment sensor configured to detect a position and/or angle of the robotic arm relative to the test object;

wherein the robotic arm is operable to automatically adjust a position and/or angle of the end effector to maintain the central ultrasonic transducer as orthogonal to the surface of the test object for the duration of a scan; and wherein the automatic adjustment of the position and/or the angle of the end effector is based off sensor data from the at least one LiDAR sensor, the at least one stereo depth camera, the at least one ultrasonic alignment sensor, and/or the at least one laser alignment sensor.

18. The system of claim 17, wherein the plurality of peripheral ultrasonic transducers includes a pair of angled ultrasonic transducers oriented opposite each other, wherein each of the pair of angled ultrasonic transducers is at an angle of less than 18° relative to an axis parallel to the central ultrasonic transducer.

19. The system of claim 17, wherein the plurality of peripheral ultrasonic transducers includes a pair of angled ultrasonic transducers oriented opposite each other, wherein the each of the pair of angled ultrasonic transducers is at an angle of between about 40° and about 45° relative to an axis parallel to the central ultrasonic transducer.

20. The system of claim 17, the robotic arm is operable to receive, via wireless or wired network connection, a scan routine from at least one user device, and wherein the robotic arm moves in accordance with the scan routine.

* * * * *